Patented Nov. 7, 1950

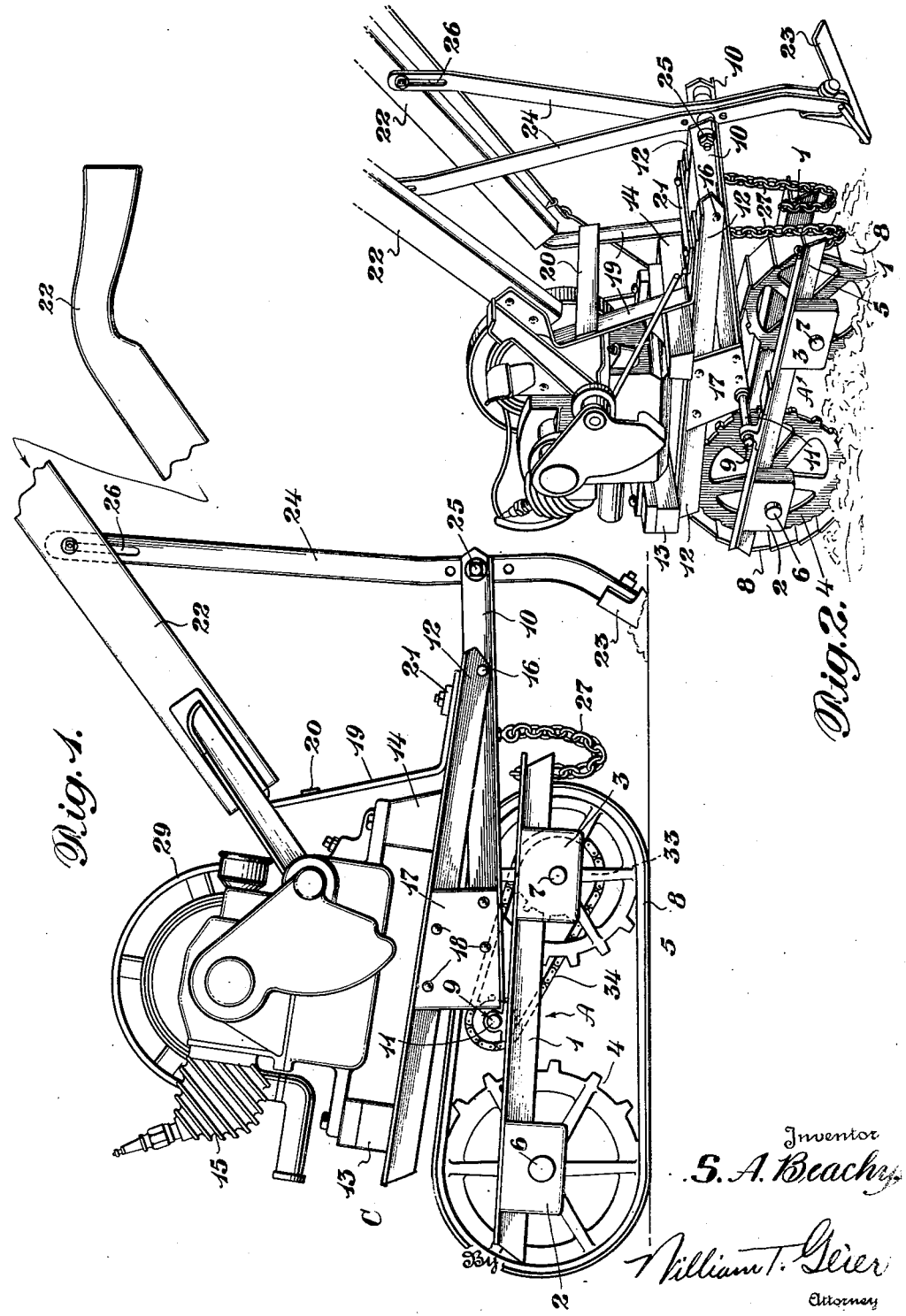

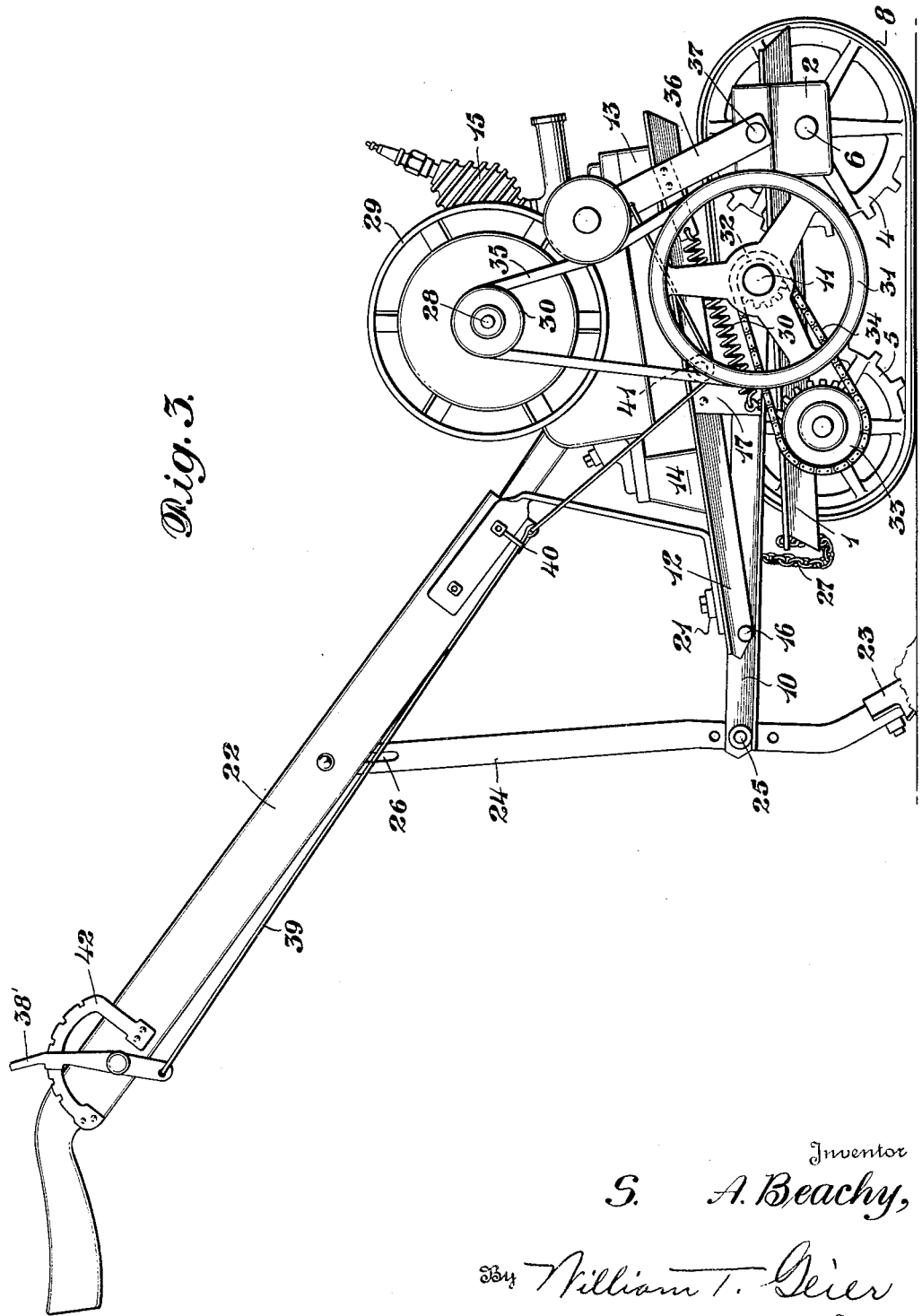

2,529,369

UNITED STATES PATENT OFFICE 2,529,369

ENDLESS TREAD GARDEN TRACTOR

Samuel A. Beachy, Salisbury, Pa.

Application March 22, 1945, Serial No. 584,169

1 Claim. (Cl. 97—48)

This invention relates to an agricultural implement, and pertains more particularly to a garden tractor of the motor driven type that is controlled and steered by a walking attendant.

Heretofore, considerable difficulty has been encountered by the operators thereof, in controlling and steering implements of this general character. This condition is primarily due to the fact that such implements are heavy and cumbersome and therefore unwieldy in manipulating the same between and around the ends of the rows prior to planting thereof.

Further, after the rows have been planted and the growing crops require cultivation, such difficulty increases due to the fact that garden tractors at present on the market are of such design that close cultivation of the crops is extremely difficult, if not impossible.

In addition to the foregoing objections, there is a marked tendency of endless track supported cultivating implements to tilt toward the rear and thereby lift the forward part of the track above the ground, when an obstacle is encountered in the path of movement thereof, thus resulting not only in a considerable loss of traction, but in the use of excessive force by the operator in order to overcome the unbalancing of the machine and consequent tendency of the cultivating implement to move to a depth greater than that contemplated. Further, the latter action places an unnecessary strain upon the source of power, which often times results in complete stoppage of the motor, but also more serious damage thereto.

Therefore, in order to overcome the foregoing difficulties, disadvantages and damages resulting from the use of such prior art machines, it is the primary object of this invention to provide an agricultural implement of the above character in which the weight of the power plant thereof and its associated mechanism, is so supported and balanced above the traction element that the latter can be maintained in engagement with the ground and the depth of the cultivating implement be regulated by the operator, regardless of the obstacles encountered or the direction in which the implement is being steered.

Another important object of this invention is to provide a mechanism of the above character wherein the power plant and cultivator carrying frame is movably connected to the traction element carrying frame in a manner which will permit rapid movement of the cultivating implement to non-ground engaging position by the operator, without the application of excessive force, during ambulatory movement of said mechanism.

Another important object of this invention is to provide a mechanism of the above character wherein the tractor element is of predetermined narrow width and is so supported within its frame as to permit the same to be moved into close proximity to growing plants without damage to the latter.

Another important object is to provide a mechanism of the above character which is extremely flexible in operation, and in which the power plant and cultivating implement is so balanced with respect to the traction element as to permit the same to be readily and quickly manipulated by the operator, with a minimum of effort, during all movements thereof and particularly while steering the same between and around growing plants and around the ends of the rows containing the same.

Still another important object is to provide a device of the above character wherein the weight and balance of the operating mechanism is predetermind with respect to the traction element, whereby to insure greater flexibility and control by the operator in steering the same during movement thereof over the surface of the ground.

A still further important object of this invention is to provide an agricultural implement of the above character which is extremely simple in construction and efficient in operation, and one which can be readily and cheaply manufactured and placed upon the market at a reasonable cost.

The foregoing and other objects and advantages will be readily apparent and thoroughly understood throughout the course of the following description and accompanying drawings, in which, Figure 1 is a fragmentary side elevation of the device forming the subject matter of this invention, with the earth working implement in ground-engaging position.

Figure 2 is a fragmentary perspective view thereof, with the earth-working implement in inoperative or non-ground engaging position, and Figure 3 is a side elevation of the invention opposite to that depicted in Figure 1.

Referring in detail to the drawings, wherein like reference characters indicate like parts throughout the several views thereof, A generally designates a main frame consisting of a pair of suitably spaced longitudinally extending side rails 1, formed of light gauge angle iron, or any other suitable material. Each of the side members 1, carry a pair of spaced depending blocks 2 and 3 secured thereto as by welding or any other desirable fastening means, and said blocks are further formed with bearings substantially centrally located therein.

Sprocket wheels 4 and 5 are positioned between the side members 1 of the main frame A and are mounted on transverse axles 6 and 7 respectively, the latter having their outwardly extending free ends mounted in the adjacent bearings formed in the depending blocks 2.

A single ground-engaging endless belt 8 of any suitable construction, but of predetermined narrow width is disposed over the sprocket wheels 4 and 5 and is driven therewith from a source of power through transmission mechanism to be hereinafter more fully described.

A bearing member 9 is carried by each of the side members 1, and is positioned substantially midway between the ends of the latter.

An auxiliary frame B is positioned above the main frame A and likewise consists of a pair of suitably spaced longitudinally extending side rails 10 of light gauge angle iron or other suitable material.

The forward ends of the side rails 10 are each mounted for movement with respect to the side rails 1, upon a transverse shaft 11, the respective outwardly extending free ends of which are each journaled in an adjacent bearing member 9 whereby to pivot the auxiliary frame B to the main frame A substantially centrally of and intermediate the ends of the side rails 1.

Mounted above and rigidly secured to the auxiliary frame B in upwardly and forwardly divergent relation thereto, is a platform C, consisting of spaced side rails 12 connected together by a pair of spaced transverse struts 13 and 14 which latter provide a base for a suitable motor 15, which in the present instance is of the internal combustion type, although any other suitable source of power may be used as desired.

The rear ends of the side rails 12 of the platform C are rigidly connected to the side rails 10 of the auxiliary frame B intermediate the ends of the latter, by suitable means 16. The front end of the platform C extends forwardly of and overhangs the front end of the auxiliary frame B and is rigidly held in upwardly and forwardly divergent relation thereto by means of supporting plates 17 secured between the adjacent side rails 10 and 12 of the auxiliary frame B and platform C respectively, by fastening elements 18 or the like.

Mounted rearwardly of the transverse strut 14 and connected one each to each one of the side rails 12, are a pair of substantially C-shaped brackets 19 held in spaced relation by a flat metal strip 20 secured to the bight portions thereof, in any suitable manner. The lower leg portions of the substantially C-shaped brackets 19 are bolted one each to one each of the side rails 12 and are further braced in spaced apart relation by means of a transverse flat metal strip 21.

The upper and rearwardly extending leg portions of the substantially C-shaped brackets 19 each support one of a pair of rearwardly extending handle members 22.

A cultivating implement 23 is suitably mounted upon the lower free ends of a pair of spaced arms 24, which latter are adjustably supported intermediate their ends to the rear ends of the side rails 10 of the auxiliary frame B as by means of the bolt and nut 25 and are connected to the handle members 22 by means of the pin and slot connection 26.

Upward swinging movement of the auxiliary frame B with respect to the main frame A is limited by means of a pair of spaced chains 27 having their lower and upper ends connected to the side rails 1 and 10 respectively.

The drive shaft 28 of the motor 15 includes a flywheel 29 as well as a pulley 30 keyed to the outer end thereof. An enlarged pulley 31 is keyed to one of the outer ends of shaft 11, while the latter also has keyed thereto, intermediate the side rails 1, a sprocket gear 32. The shaft 7 carrying sprocket wheel 5, likewise carries a second sprocket gear 33, also keyed to shaft 7 so as to rotate therewith. A sprocket chain 34 is disposed over and in driving relation to the sprocket gears 32 and 33.

The pulleys 28 and 31 are connected by a flexible belt 35 which is normally held in slipping engagement therewith by means of a belt tightener 36, the latter being pivoted to auxiliary frame B as at 37.

A tension spring 38 having one end connected to auxiliary frame B and its opposite end connected to the belt tightener 36, is of insufficient strength in itself to urge the belt 35 into power transmitting engagement with the pulleys 29 and 31.

In order to control the transmission of power from the pulley 28 to the pulley 31, a manually controlled lever 39 is pivoted to one of the handles 22 adjacent its upper end and is in turn connected to the belt tightener 36 by means of a cable 39 suitably supported by means of a screw-eye 40 secured to the lower end of said handle 22 and anti-frictionally guided for sliding movement by means of a pulley 41 carried by the platform C.

A rack bar 42 is secured to the upper end of said handle 22 adjacent the control lever 39 for holding the latter in its various positions of adjustment so as to maintain predetermined pressure upon the belt tightener 36 and thereby the belt 35, as desired by the operator.

From the foregoing, it will be seen that the speed and power of movement of the mechanism is controlled by the amount of pressure applied to the belt 25 through the lever 39, the belt 35 thus transmitting power from the pulley 29 to the pulley 31, shaft 11, sprocket gear 32, chain 34, sprocket wheel 33 and thence to the traction belt or member 8.

During cultivating movement of the mechanism just described, and in the event an obstacle such as a stone or the like is encountered the operator in order to prevent rearward tilting of the implement, merely applies slight pressure in an upward direction to the handles 22. This action results in forward tilting of the auxiliary frame B and platform C about the shaft 11, as a fulcrum, and thereby not only prevents, but positively maintains the traction belt 8 in full engagement with the surface of the ground. This action further results in lifting the cultivating member 23 out of engagement with the ground and thus prevents the placing of greater stress upon the motor 15 and attendant mechanism due to the cultivator 23 entering deeper into the ground as would result if the mechanism were permitted to rock in a rearward direction, as customarily happens with such devices at present in use.

The foregoing advantages of the instant invention results from the predetermined balancing of the motor upon the auxiliary frame B and platform C and from the placing of the pivotal connection of the frame B with the frame A, at a point midway or substantially midway between the ends of the side rails 1.

Thus it will be seen from the foregoing that maximum traction of the belt 8 is obtained at all times during the operation of the device regardless of the direction of movement of the same or of the obstacles encountered. Further the provision of a traction belt of predetermined narrow width permits the machine to be operated closely adjacent to growing plants without damage thereto.

It is to be understood that the form of my invention herein shown and described, is to be taken as a preferred example of the same, and that various changes in the shape, size and arrangement of parts may be resorted to, without departing from the spirit of my invention, or the scope of the subjoined claims.

I claim:

In a cultivator, a main frame including a pair of spaced longitudinally extending side rails, an endless ground engaging traction member mounted on said frame between the side rails thereof, an auxiliary frame pivoted to the main frame intermediate the ends of the latter, a platform carried by said auxiliary frame having a forward part extending beyond and overhanging the point of connection between said frames, an earth working implement connected to the auxiliary frame, a motor mounted on and having its major portion disposed upon the forwardly extending part of the platform in counterbalancing relation to said earth working implement and having driving connection with the traction member for actuating the latter, and means carried by the auxiliary frame for manually tilting the latter to thereby move the earthworking implement above the surface being worked independently of the main frame and the endless traction member when the latter encounters an obstacle tending to tilt the same in a direction to force the earth-working implement below a predetermined depth in the surface being worked.

SAMUEL A. BEACHY.

REFERENCES CITED

The following references are of record in the file of this patent:

UNITED STATES PATENTS

| Number    | Name      | Date          |
|-----------|-----------|---------------|
| 1,302,317 | Cowan     | Apr. 29, 1919 |
| 1,754,617 | Esch et al. | Apr. 15, 1930 |
| 1,804,412 | Glasier   | May 12, 1931  |
| 1,978,338 | Bready    | Oct. 23, 1934 |
| 2,052,068 | Ziegler   | Aug. 25, 1936 |
| 2,388,981 | Kuntz     | Nov. 13, 1945 |